Jan. 3, 1928.

J. J. WOLFROM 1,654,567

VEHICLE TIRE

Filed June 1, 1925

INVENTOR.
JONES J. WOLFROM
BY
ATTORNEY.

Patented Jan. 3, 1928.

1,654,567

UNITED STATES PATENT OFFICE.

JONES J. WOLFROM, OF FLINT, MICHIGAN.

VEHICLE TIRE.

Application filed June 1, 1925. Serial No. 33,888.

My invention relates to a new and useful improvement in a vehicle tire, adapted for use with a special construction of rim, and has for its object, the provision of a vehicle tire, adapted for mounting on a sectional rim.

Another object of the invention is the provision of a tire having a plurality of inflated rubber balls, or elastic pneumatic containers mounted within a metallic casing, so arranged and constructed as to permit the radial movement within certain limits of the casing relatively to the felly of the wheel.

Another object of the invention is the provision of a special retaining member adapted for retaining the metallic casing on the felly of the wheel and at the same time, for permitting its radial movement relatively to the felly.

Another object of the invention is the provision of a metallic casing, adapted for the reception of a plurality of inflated rubber balls, provided with means for preventing circumferential movement of the rubber balls in the casing beyond a certain limit.

Another object of the invention is the provision of a metallic casing having retaining means on its periphery, for engaging and holding in secure position a tread member.

Other objects will appear hereinafter.

The invention consists in the combination and arrangement of parts hereinafter described and claimed.

The invention will be best understood from a reference to the accompanying drawings, which form a part of this specification and in which, Fig. 1 is a side elevational view of the invention, with a part broken away, showing parts in section, Fig. 2 is a sectional view taken on substantially line 2—2 of Fig. 1, Fig. 3 is a side elevational view of the rim used in the invention, Fig. 4 is a fragmentary plan view of the tread member, Fig. 5 is an enlarged fragmentary sectional view of one of the rubber balls used in the invention, illustrating the method of mounting the valve thereon.

As shown in the drawings, the invention is adapted for use with a vehicle wheel 9 having a felly 10, secured to which are retaining lugs 11 mounted on bolts 12, provided with nuts 13, the bolts being projected through the felly 10. The lugs 11 are adapted to engage a neck or projection formed on the rim 14. As clearly seen in Fig. 3, this rim 14 is made from a plurality of sections 36 and 36', which are hingedly connected together at 36''. A co-operating pair of sections 37 and 37' hingedly connected together at 37'' is provided, the meeting ends of the two pairs of sections being cut in an offset, as shown. As shown in Fig. 2, the rim 14 is provided, at opposite sides with recesses 15, in which are adapted to engage the inner edges of locking members 38, which are preferably made from rubber, or other flexible material, the outer edge 38' of each of which is adapted to engage in a recess 18 formed in an enlarged portion along the edges of the metallic casing 17. Extending transversely of the casing 17, so as to connect the sidewalls thereof and form a partition therein, are the partition forming members 20, which are spaced apart, as shown in Fig. 1. Mounted on the periphery of the casing 17 and extending around its periphery, at opposite sides, are keepers 21 and 21', which are spaced apart at their free ends to provide a channel for the reception of the flanges 23 and 23', which project from the opposite edges of a rubber tread member 22. Extending throughout the length of the tread member 22 are metallic reinforcing plates 24 and 24'. This tread member is formed in sections, a plurality of the sections being necessary to cover the periphery of the casing 17. Projected through the metallic members 24 and 24' and through the casing 17, are bolts 25, which carry nuts, adapted for engaging in the recesses 26 and 26' formed in the tread member 22. As shown in Fig. 4, recesses 27 and 27' are provided, adjacent one end of each section of the tread member 22, each of these recesses terminating in an elongated opening 28 and 28' respectively, for the reception of the bolts 25, the openings leading into the recesses 26 and 26' being adapted for a snug fit of the bolts 25. In mounting the tread 22 upon the casing 17, the flanges 23 and 23' are brought into close approach to each other and inserted in the channels formed by the keepers 21 and 21' and the casing 17. To permit the inward flexing of the flanges 23 and 23', the tread member 22 is provided on its inner surface with a slot 22'. Positioned in the casing 17, between the partitions 20, so as to have slight play between the partitions 20, are inflated rubber balls 29. These balls comprise an outer casing 29', which is made from rubber and within which is positioned a rubber ball 30, carrying a valve stem 31, projecting thereinto, said valve stem being mounted on the ball 30 in any desirable well known manner. The head of the stem 31 is provided with a peripheral groove 32, adapted for engaging the resilient wire 33 which is positioned in an opening formed in the plug 34, which is threaded into the metallic ring 35 mounted upon the ball casing 29', the plug 34 being provided with a diametrically extending groove 34' in which a screw driver, or other like tool may be engaged, for removing the plug from its mountings.

In operation, when the casing 17 is mounted upon the rim 14, and the inflated balls 29 are placed therein, the pressure of the vehicle upon the tire will compress, to a certain extent, the balls 29 and have a tendency to move the balls circumferentially of the casing 17. This circumferential movement, of course, will be limited by the partitions 20. As the load is placed upon the tire, the casing 17 is permitted to move radially inwardly of the wheel, the retaining strips 38 being sufficiently flexible to permit this movement. As shown in Fig. 2, the extreme inner edges of the retaining strips 38 are angularly turned, and seated in the recess 15, suitable keepers 38" being provided to engage this angularly turned edge to retain it in position in the recess 15. As shown in Fig. 2, shoulders 16 are provided on the inner surface of the rim 14, which serve to engage the retaining strips 38 and prevent their outward movement to too great an extent to make the device operative. The angularly turned edges 38' are slidably positioned in the recesses 18, the arrangement being sufficient to permit the movement of the various parts, to accomplish the desired result, the straps 38 preventing entry of dust into the casing.

When it is desired to remove one of the balls, one of the sections of the rim may be moved relatively to its other sections to permit the removal of the casing 17.

With a tire and co-operating rim constructed in this manner, I have provided a tire which has all of the advantages of the ordinary pneumatic tire, and at the same time, is free from any of its undesirable features. The possibility of punctures is reduced to a minimum, and the deflation of the entire tire upon a puncture is avoided.

While I have illustrated and described the preferred form of structure, I do not wish to limit myself to the precise form of structure shown, but desire to avail myself of such variations as come within the scope of the appended claims.

What I claim is:

1. A device of the class described, comprising a metallic casing; a plurality of transversely extending partitions mounted therein; a plurality of inflated balls mounted in said casing, intermediate said partitions, the edges of said casing being provided with slots; a rim adapted for carrying said casing; flexible retaining members mounted on said rim and having one edge angularly turned, adapted for engagement in the slots of said casing; and a tread member mounted on the periphery of said casing.

2. A device of the class described comprising: a metallic casing having the marginal edges thereof slightly enlarged and each provided with a circumferentially extending slot; transversely extending partition walls mounted in said casing and connecting the opposite walls thereof; a rim adapted for mounting on a wheel; resilient keepers secured at one edge to said rim and having the opposite edge angularly turned and adapted for engagement in said slots in said edges of said casing; a plurality of rubber balls mounted in said casing intermediate said partitions adapted for engaging said rim, said balls resisting inward radial movement of said casing.

In testimony whereof, I have signed the foregoing specification.

JONES J. WOLFROM.